United States Patent
Hichwa et al.

(10) Patent No.: US 7,194,473 B1
(45) Date of Patent: Mar. 20, 2007

(54) APPLICATION PLATFORM DEVELOPMENT ENVIRONMENT

(75) Inventors: Mike Hichwa, Washington, DC (US); Joel Kallman, Powell, OH (US); Thomas Kyte, Leesburg, VA (US); Sergio A. Leunissen, Bethesda, MD (US)

(73) Assignee: Oracle International Corporation, Redwood Shores, CA (US)

( * ) Notice: Subject to any disclaimer, the term of this patent is extended or adjusted under 35 U.S.C. 154(b) by 403 days.

(21) Appl. No.: 10/325,136

(22) Filed: Dec. 23, 2002

Related U.S. Application Data

(60) Provisional application No. 60/356,740, filed on Feb. 15, 2002.

(51) Int. Cl.
*G06F 17/30* (2006.01)
(52) U.S. Cl. .................... 707/101; 707/102; 707/10
(58) Field of Classification Search .......... 707/1–10, 707/100–104.1; 717/100, 177; 510/176; 709/226
See application file for complete search history.

(56) References Cited

U.S. PATENT DOCUMENTS

| | | | |
|---|---|---|---|
| 6,026,404 A | 2/2000 | Adunuthula et al. ......... 707/10 |
| 6,225,995 B1 | 5/2001 | Jacobs et al. ............... 715/738 |
| 6,247,056 B1 | 6/2001 | Chou et al. ................. 709/229 |
| 6,334,114 B1 | 12/2001 | Jacobs et al. ................. 705/25 |
| 6,446,204 B1 | 9/2002 | Pang et al. ................. 713/153 |
| 6,631,512 B1 * | 10/2003 | Onyeabor ................... 717/100 |
| 6,638,899 B1 * | 10/2003 | Wakiya et al. ............. 510/176 |
| 6,813,637 B2 * | 11/2004 | Cable ......................... 709/226 |
| 6,832,226 B1 * | 12/2004 | Parker ....................... 707/101 |
| 6,901,590 B2 * | 5/2005 | Narayanaswamy et al. .. 717/177 |

* cited by examiner

*Primary Examiner*—Yicun Wu
(74) *Attorney, Agent, or Firm*—Bingham McCutchen LLP

(57) ABSTRACT

A method for deploying a web-based application from a development site to a client site is described in which procedural logic of the web-based application is captured as declarative statements and stored in database objects managed by the database server. During operation of the application, a request indicating a page number of one of the pages is received from a user to perform an operation within the application. An instruction is retrieved from the database based on the page number, and the request is completed based on performing the retrieved instruction. The instructions may include a branch, a computation, a validation, or other kind of processing data.

15 Claims, 8 Drawing Sheets

(BACKGROUND)

US 7,194,473 B1

APPLICATION PLATFORM DEVELOPMENT ENVIRONMENT

RELATED APPLICATIONS

The present application claims the benefit of U.S. Provisional Patent Application Ser. No. 60/356,740 filed on Feb. 15, 2002, the contents of which are hereby incorporated by reference.

FIELD OF THE INVENTION

The present invention relates to computer systems and more particularly to an application platform deployment environment for web-based applications.

BACKGROUND OF THE INVENTION

Most web-based applications today are designed in accordance with the three-tier model. Referring to FIG. 8, the first tier of the three-tier model includes a web client 801, which is typically a browser executing on a personal computer. The web client 801 is in communication via a network 803, e.g. an intranet or Internet, with an application server 811 in the second tier. The web client 801 interacts with the application server 811 using hypertext transfer protocol (HTTP) requests to get web pages and forms from the application server 811 and post data from completed forms to the application server 811. In some implementations, a web server (not shown) is employed to relay the HTTP requests between the network application server 811 and the application server 811.

The application server 811 of the second tier in the three-tier model comprises several components. In particular, the application server 811 includes executable code 813, which is responsible for implementing the procedural aspects of the web-based application. For example, if the web-based application is an on-line catalog, then the executable code 813 would handle the validation and processing of form data received from the web client 801 for purchasing a product, calculation of new results such as shipping costs, and generation of hypertext markup language (HTML) or extensible markup language (XML) output to be sent to the web client 801, for example, to display information about the product or confirming purchase of the product. The executable code 813 is also responsible for managing user session state 815, which includes transient information about the user, such as the user's name or identity, and which pages the user has visited. The session state 815 is typically stored in virtual memory on the application server 811.

Typically, the results of the user's interaction with the web-based application results need to be saved in a persistent memory. For example, if the user of the on-line catalog purchases a product, then the application server 811 will record the user's order using a database server 821 on the third tier. For on-line catalog applications, the database server 821 is commonly an on-line transaction processing (OLTP) database server. The database server 821 stores the information received from the application server 811 as application data 823 in a database. The database server 821 is also configured to fetch previously stored data in response to requests from the application server 811.

Although the three-tier model is popular, the model suffers from several disadvantages. For example, three-tier web applications are difficult to develop, distribute, and deploy. Most of the development effort is focused in the second tier, in which the developer of the web application codes all the procedural logic and session management functions for the web application in a third-generation language (3GL) such as C, C++, Visual Basic, and Java. The application code is compiled and tested on a development machine and uploaded to the application server 811. If multiple developers are involved, which is true for most non-trivial web applications, the developers must coordinate their access to the source code files, compile, and test the application on the development machine. The source code revision control and compilation mechanisms are unsophisticated and generally require a command-line interface to be used. Therefore, access to the development machine for those developers on the road, in different parts of the world, or otherwise local is difficult because the non-local developers have to telnet and login to the development machine and obtain a command line prompt.

Distributing updates to web-based application is problematic because it requires shutting down the application 811, installing the new application code 813, testing the installation, and only then permitting users to use the application server 811. Business-critical web sites, however, are operating 24-hours a day and seven days a week and the downtime involved in upgrading a three-tier web-based application may result in a considerable loss of sales.

Therefore, there is need for an application platform environment upon which it is straightforward to develop and deploy web-based applications

SUMMARY OF THE INVENTION

These and other needs are addressed by the present invention by capturing the procedural logic of the web-based application as declarative statements and storing the declarative statements in database objects managed by the database server. In this scenario, developing and upgrading web-based applications are straightforward: the developers merely update tables in the database to impart additional functionality. When the upgrade application is properly tested, then the users can be switched over instantaneously, by aliasing the tables from which the users obtain the logic of the application.

Accordingly, one aspect of the invention relates to a method and software for operating a web-based application in which a request is received from a user to perform an operation within the application. The application includes a collection of pages stored in a database and the request indicates a page number of one of the pages. An instruction is retrieved from the database based on the page number, and the request is completed based on performing the retrieved instruction. The instruction may include a branch, a computation, a validation, other kind of processing data.

Another aspect of the invention pertains to method for deploying a web-based application from a development site to a client site. Tables storing the application in a first database at the development site are updated and then distributed from the development site to a second database at the client site. The contents of the tables distributed from the development site are then transferred to corresponding tables at the client site in a single transaction.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for application platform development and deployment are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Conceptual Overview

Figure 1:
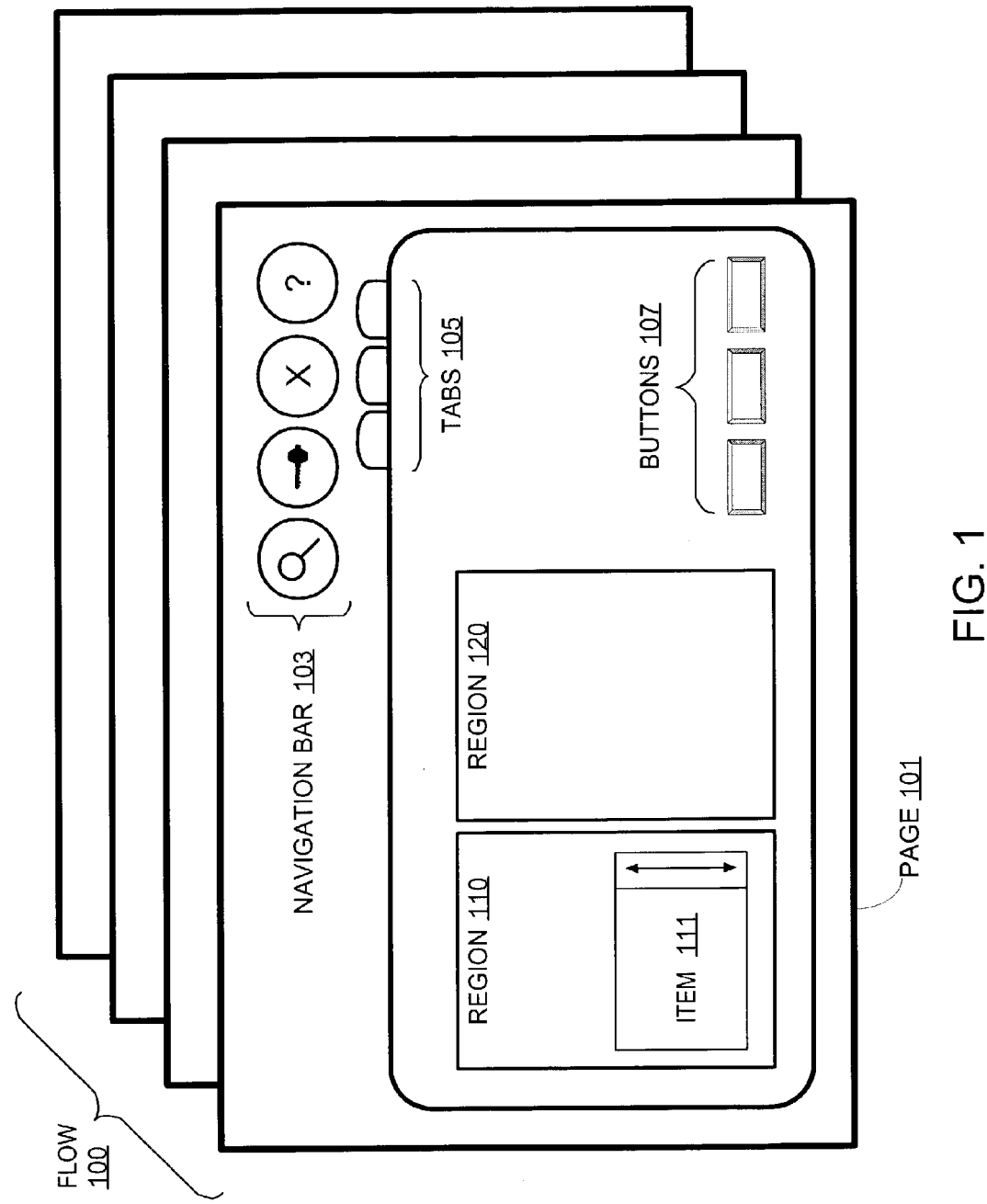
FIG. 1 illustrates an architecture of an embodiment of the present invention.

With reference to FIG. 1, a web-based application, in accordance with one embodiment of the present invention, comprises a collection of related pages 101, referred to as a flow 100. Each flow 100 corresponds to a separate web-based application and is identified by a "Flow ID," which is preferable an integer. Each page 101 is identified by a numeric "Page ID," a name, and a number of text attributes such as a title, header, and footer. The text attributes (not shown in FIG. 1) are used to the label each page 101 that is displayed to the user. The page 101 may also include additional content such as a navigation bar 103, tabs 105, and buttons 107. The page 101 may also contain one or more page regions 110 and 120, each of which may include a one or more items or buttons. For example, item 111 of page region 110 is a list box. The page 101 illustrated in FIG. 1 is for purpose of example and the present invention is not limited to the particular user interface components illustrated therein.

Each page 101 is a building block of the web-based application and presents an interface for displaying information to the user of the web-based application or obtaining information from the user. The user interacts with the web-based application by using a browser or other web client to visit the various pages 101 of the flow 100. In some cases, the initial page the user visit requires the user to authenticate for a session.

The web-based application is responsible for generating the markup for each page 101 so that the user's web client can render the markup and display the page to the user. At each page 101, the user may enter information in items 111 of the page and press a button 107 to send or "post" the entered information to the web-based application. Alternatively, the user may click on the navigation bar 103, any of the tabs 105, or any of the buttons 107.

Upon posting information or upon clicking on a rendered component, the web-based application processes the information and generates markup for a new page of the flow 100. For the new page, the user may fill out information in the items or activate buttons and tabs, thereby causing another page to be rendered. This process repeats until the user logs out or otherwise terminates the session.

Architectural Overview

Figure 2:
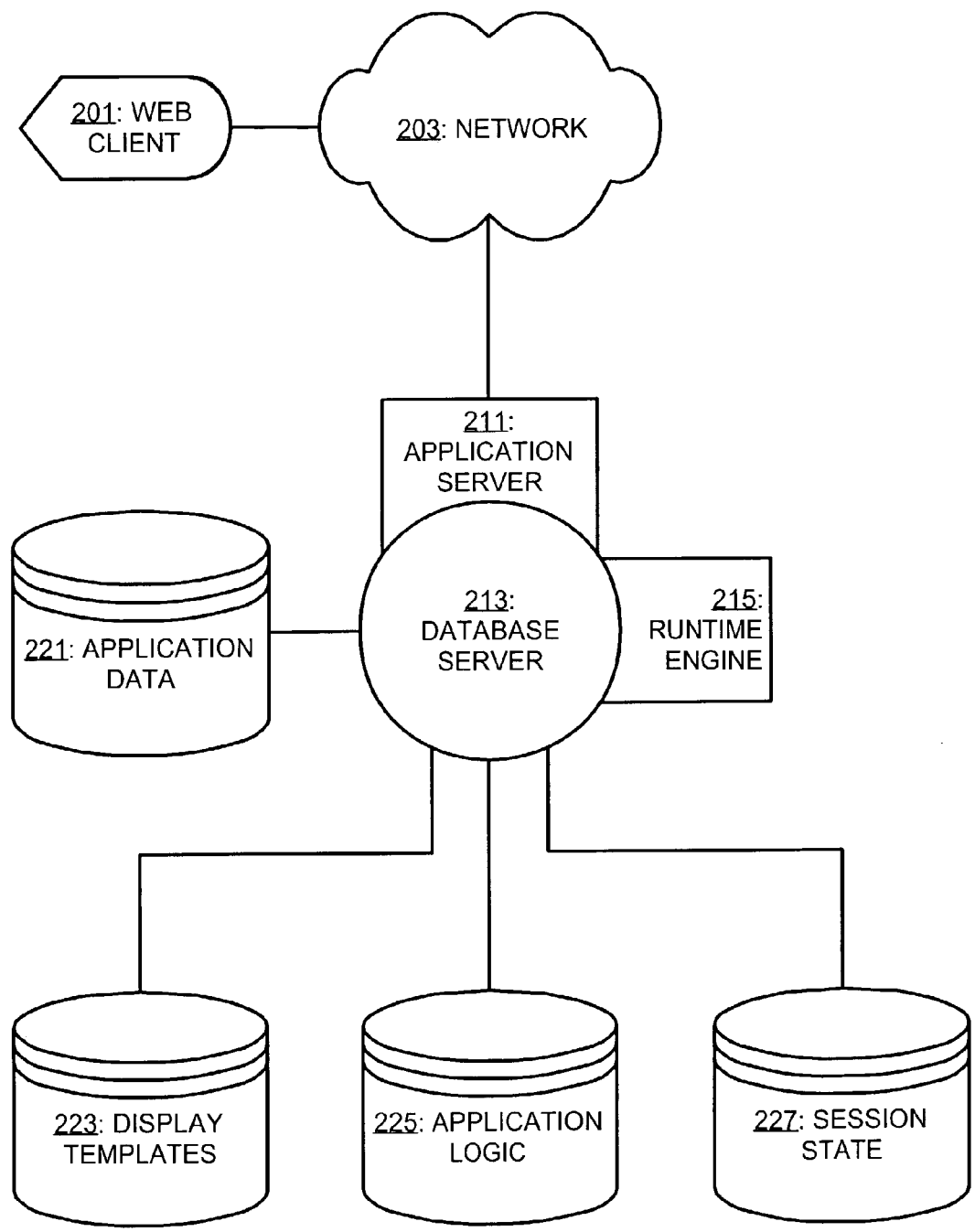
FIG. 2 shows the user interface of an embodiment of the present invention.

FIG. 2 illustrates the architecture of one embodiment of the present invention for deploying a web-based application, in which a web client 201 is in communication with a network 203. The web client 201 can be a browser capable of rendering markup related to the web-based application, and the network 203 can include an intranet or a packet switching network such as the Internet.

In addition to rendering markup for the user of the web-based application, the web client 201 is also configured to send messages to an application server 211 via the network 203 using a protocol such as the hypertext transfer protocol (HTTP). This messages may include, for example, requests to fetch ("GET") a page identified by a Uniform Resource Locator (URL) and to send ("POST") data entered by the user into a form rendered by the web client 201.

The application server 211 is responsible for receiving requests from the web client 201 and passing the requests onto a database server 213 with minimal processing and receives marked up results from the database server 213. The application server 211 can be implemented in various ways, including as a separate process for receiving HTTP requests and submitting procedure calls to the database server 213 or as a built-in component of the database server 213 itself.

The database server 213 manages all the information and instructions necessary to execute the main functionality of a web-based application in accordance with this embodiment of the present invention. Specifically, database server 213 employs a runtime engine 215 and maintains the following collections of data that store the persistent state, behavior, user interface, and transient state of the web application, respectively: application data 221, display templates 223, application logic 225, and session state 227.

The application data 221 contains the persistent state of the web-based application. For example, if the web-based application is an on-line catalog, then the application data 221 would contain descriptions of the products offered for sale and orders to purchase the products made by customers using the web-based application.

The display templates 223 contain information specifying the look-and-feel of the web-based application. More specifically, the display templates 223 define many aspects of the display of a page, including how each page 101 and regions 110 and 120 on the page 101 are to be rendered. The templates include boilerplate markup with placeholders for generated markup text to be inserted at specific points in the boilerplate. The web-based application developer need not specify a template for each and every page, because a default template is available.

The application logic 225 records the information for controlling navigation between the pages, processing the data entered by the user, and other operations necessary to implement the workflow logic of the web-based application. For example, the application logic 225 may record computations that are performed on the user's data (e.g. the computation of sales tax), conditional branching (e.g. determining which page to go to based on the value of data), processing (e.g. the storage of the user's input in the application data 221), and validation of the user's input for syntactical correction.

The session state 227 is internally identified by a session ID or by user. Sessions are a logical concept that allows multiple page views to be identified as all part of a single logical "session". This, every generated page view by the web-based application is associated with a session ID. Web-based applications that are authenticated (i.e. require a user to login) also maintain the concept of a user. Different users could use a "public" web-based application (an application that does not require the user to login), in which each user would have a unique session. However, interactions with the flow would be conducted with the rights and privileges of a single user (typically a "public user"). Session state 227 is broad term used to maintain values for: Flow Items, Page Items, Flow Preferences, Collections, which are variables that store transient state for the current session.

The runtime engine 215, which can be implemented as a PL/SQL (Programming Language/Structured Query Language, available from Oracle Corp.) package, contains at least two entry points: show and accept, which correspond to the GET and POST requests, respectively. The text of the URL in the requests received from the web client 201 identifies an entry point in the runtime engine 215 along with parameter. In one embodiment, the text of the URL employs a syntax to identify a specific flow and page combination. In one implementation, this syntax takes the following form: "f?p=Flow:Page:Session:Request: . . . ", where "Flow" contains the Flow ID of the web-based application, "Page" contains the Page ID of the particular page being specified, "Session" identifies a particular instance of the web-based application the user is using, and "Request" identifies the button or tab that the user has clicked on. Other parameters, such as those relating to debugging or clearing caches, may be appended to the URL.

The application server 211 converts the URL text into a database procedure call that causes the database server 213 to invoke the corresponding entry point in the runtime engine 215. In response, the runtime engine 215 integrates the application data 221, display templates 223, application logic 225, and session state 227 in response to calls relayed by the application server 211 to produce a page comprising markup output that is sent back to the application server 211 and then ultimately to the web client 201 where the page is rendered for the user.

Because all the information necessary for executing the web-based application is stored in the database, web-based applications in accordance with this aspect of the present invention are easy to develop and upgrade. In particular, developers can use a web browser to interact with the database server 213 from anywhere in the world to create and update the application data 221, display templates 223, application logic 225 information. Upgrading the web-based application is straightforward, because all the changes for the tables for the upgraded web-based application can be applied in a single database transaction and committed at one time. While the changes are being applied in the transaction, users continue to use the older version of the web-based application until the all the changes are committed. Then, the users of the web-based application will automatically use the newer version of the web-based application for their transactions that begin after the changes were committed, so that the next time that the users will access a page in a session, that page will be generated from the newer version of web-based application. As a result, upgraded web-applications can be redeployed in the midst of the users' sessions without forcing the users to stop their session.

Furthermore, the application engine 215 itself can also be upgraded without disruption. For example, the new version of the application engine 215 can be installed in its own schema, different from the schema of the previous version. When the new version is ready to go live, a public synonym for the application engine 215 is modified to point to the version in the new schema, and the users automatically use the newer version of the application engine 215.

Display Templates

Figure 3:
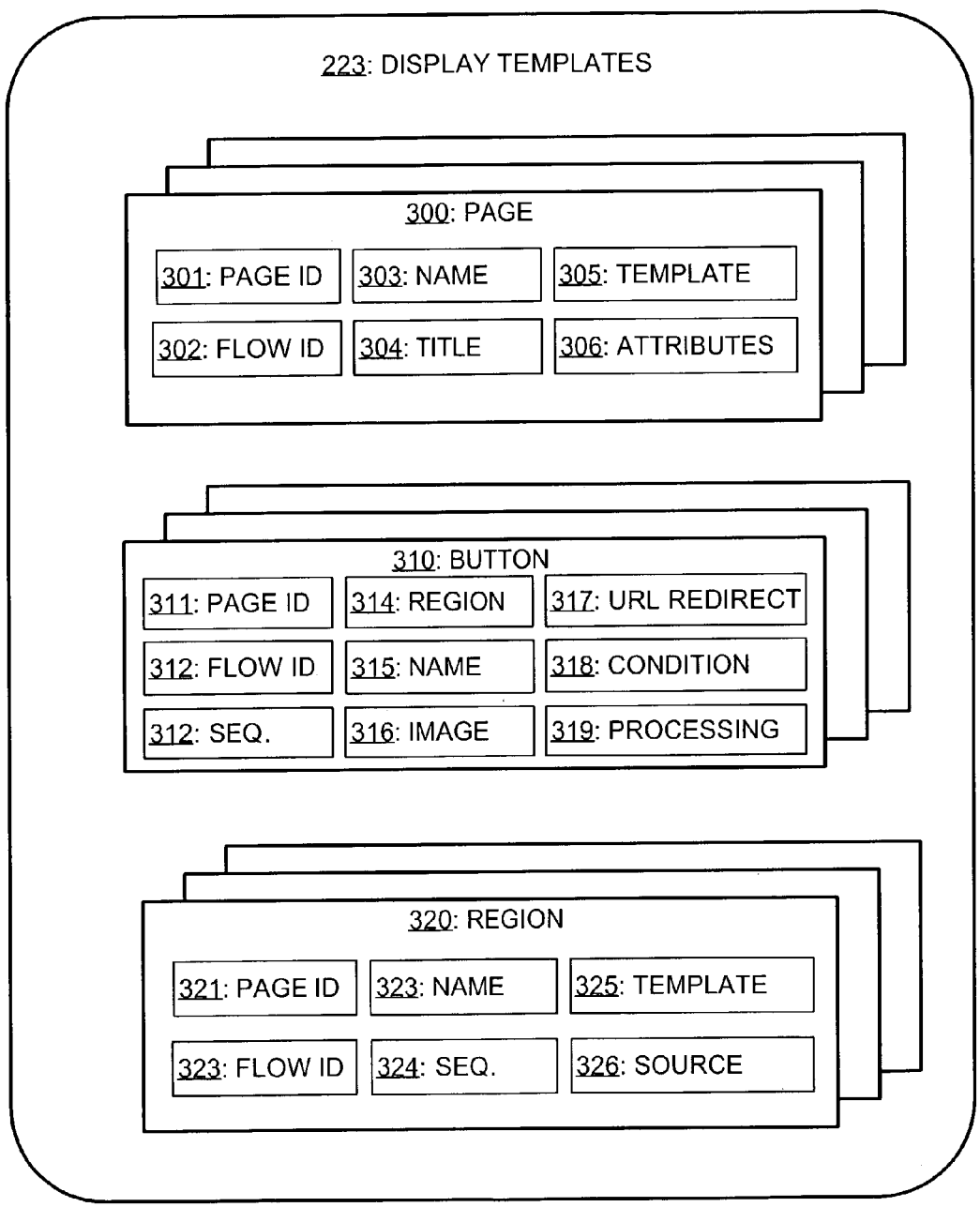
FIG. 3 depicts an implementation of display templates stored in a database in accordance with an embodiment of the present invention.

The display templates 223 data govern the user interface of the web-based application. Further details of the display templates 223 data are shown in FIG. 3.

Each page 300 in a flow is identified by a Page ID attribute 301 and a Flow ID attribute 302. Combined with the Flow ID attribute 302, the Page ID attribute 301 uniquely identifies a particular page in the web-based application. Navigating to a page using the "f?p" URL syntax is performed using three primary attributes: a Flow ID, a Page ID and a session ID, e.g.: "f?p=100:1:&SESSION." In this example, 100 is the Flow ID, 1 the Page ID and a &SESSION substitution string that is replaced with the user session ID. The name attribute 303 is a descriptive name for the page. This name is not part of any user interface (UI) generated by the flow-rendering engine; rather, the page identifying text in the user interface is indicated by the title attribute 304. A page 300 also has a page template 305 and page attributes 306. Page templates 305 control how a page is displayed and define the look of the web-based application, and page attributes specify the default text and markup to be inserted to the page templates 305 for substitutable strings.

Each flow identifies a page template 300 to be used as a default-page template. In addition, an error-page template and a printer-friendly template may be defined. The error-page template, which can be the same as the default-page template, is used each time an error page is generated. The printer-friendly template is used when a user requests a page to be view in a printer friendly mode (e.g. without tabs or navigational aid, etc.) so that the page can be printed nicely.

A flow can have any number of page templates 305, and each page within the flow can specify a specific page template or, if no page template is explicitly specified, the default-page template is used. In one embodiment, a page template 305 contains the markup tags to open each markup document or page. For example, a page template in HTML typically contains tags such as <HTML><BODY></BODY></HTML>.

Page templates 305 can be quite complex because they use any of the features available for marked up web pages, including cascading style sheets, open HTML forms, and display of images. To support a declarative programming model, the page templates 305 may include placeholders for substitution strings, such as #BODY#. The #BODY# substitution string identified where the standard regions are to be places. Some substitution strings such as #NAVIGATION_BAR# have sub-templates that expand the definition of how a navigational bar is to be displayed. In one embodiment, at least the following page template substitution strings are available:

The #ONLOAD# substitution string is included within the markup body definition used to set the cursor into first field of the page. The #TITLE# substitution string is used for the page title (typically within HTML <TITLE></TITLE> tags). The #TAB_CELLS# and #NAVIGATION_BAR# substitution strings covers the formatting of the tabs 105 and navigation bar 103, respectively. The #NOTIFICATION_MESSAGE# substitution string is set by application developers to communicate messages to the user. The #SUCCESS_MESSAGE# substitution string is used when a page process is successful.

Some page template substitution strings require additional attributes. In this case, the high-level template substitution string merely indicates existence and placement within a page template, and a sub-template definition is expanded to specify exactly how its components are displayed. For example, the body title used by a #BODY_TITLE# header substitution string is the page sub-title attribute. The page title attribute defines the #TITLE# substitution string. The display of the page sub-title (body title) can be customized by adding markup before and after the display of the sub-title; e.g. <b>#BODY_TITLE#</b>.

Templates are static text, with placeholders for dynamic content. For example, the #BODY# substitution string can be substituted with dynamic and conditional region content. However, dynamic components can also be added to the page. Dynamic text into a page template by using a database tag, which allow one to code a database processing language such as PL/SQL directly. For example, if it is desired to run PL/SQL routines that generate HTML for every page that references this template, then the following database tag may be used: <ORACLE>htp.p('hello');</ORACLE>

Buttons 310 are provided for processing or navigational purposes. The attributes of a button 310 include a Page ID 311 and a Flow 312, which specifies the particular page the button 310 located upon. Every button 310 on a page is assigned a sequence number 312 that is unique to the page for identification. The region in which the button 310 is disposed is further indicated by the region attribute 314, and the region template for the region handles the exact position the button is positioned.

The name attribute 315 holds the internal name of the button. If the name attribute 315 of the button matches a standard name such as CANCEL, FLOW_RESET_BUTTON, FLOW_PREVIOUS_PAGE, and FLOW_NEXT_PAGE, then a special meaning is assigned to the button's function.

The image attribute 316 is provided for specifying how the button is to be rendered on the web client. This attribute may include such information as the pathname of an image file, height and width information, and alternative text information. Additional attributes such as position and alignment (not shown) may be used to give create greater control over the look of the web-based application, for example, to place buttons in different places, depending on the look.

The URL redirect attribute 317 specifies a URL when the form data on the page is not to be submitted to the web-based application. This feature is particularly useful for cancel buttons. The condition attribute 318 allows the button to be conditionally displayed. The condition can be defined by an expression. The page processing attribute 319 cross-references to the appropriate logic control in the application logic 225 portion of the web-based application.

A region 320 is area of a page 300. The attributes of a region 320 include a Page ID 321 and a Flow 322, which specifies the particular page upon which the region 320 is located. Every region 320 has a name attribute 323 holds an internal name of the region and a sequence number 324 that is unique to the page for identification. A page 300 can have any number of regions 320. Regions 320 allow other page attributes such as buttons and items to be associated with a region 320. Page attributes that are associated with a region 320 are only displayed if the region is displayed.

Regions are displayed using a region template 325. Region templates 325 can be minimalist (e.g. generate no additional markup) or elaborate (e.g. generate markup tables and images that box the content). Region templates 325 have two structured positions: the body and the title. The body identifies where the source 326 of the region is to be placed. A very simplistic region template would include just the text of the source 326: #BODY#.

In addition to the title and body substitution strings, region templates also support specific button positions. When a button is created, the button can go in a generic region position such as TOP or BOTTOM, but to have control over the exact placement of the button within a region, the button can be specified to go into a region position. For example, if a button is specified to go into "region position EDIT", then the region template for the region would include a #EDIT# substitution string to place the button. Other region positions for buttons, as specified by region substitution strings, may include: #CREATE#, #HELP#, #CLOSE#, #EXPAND#, #NEXT#, and #PREVIOUS#.

The source or content of a region is indicated by the source attribute 326. The region source is interpreted differently based on its type. Various types of sources 326 are supported, which may include the following: HTML_TEXT, which can include markup text based substitutions; JAVA, in which the source is java code that outputs markup; PLSQL_PROCEDURE, which is a PL/SQL anonymous block that is run dynamically at execute time and outputs markup, e.g. htp.p('hello world'); FUNCTION_RETURNING_SQL_QUERY, which is a PL/SQL function body that returns a SQL query that returns rows of data; SQL_QUERY, which is a standard SQL query; and URL, which means to go to the URL specified in the region body, retrieve the content, and put the retrieved content into the region.

Application Logic

Figure 4:
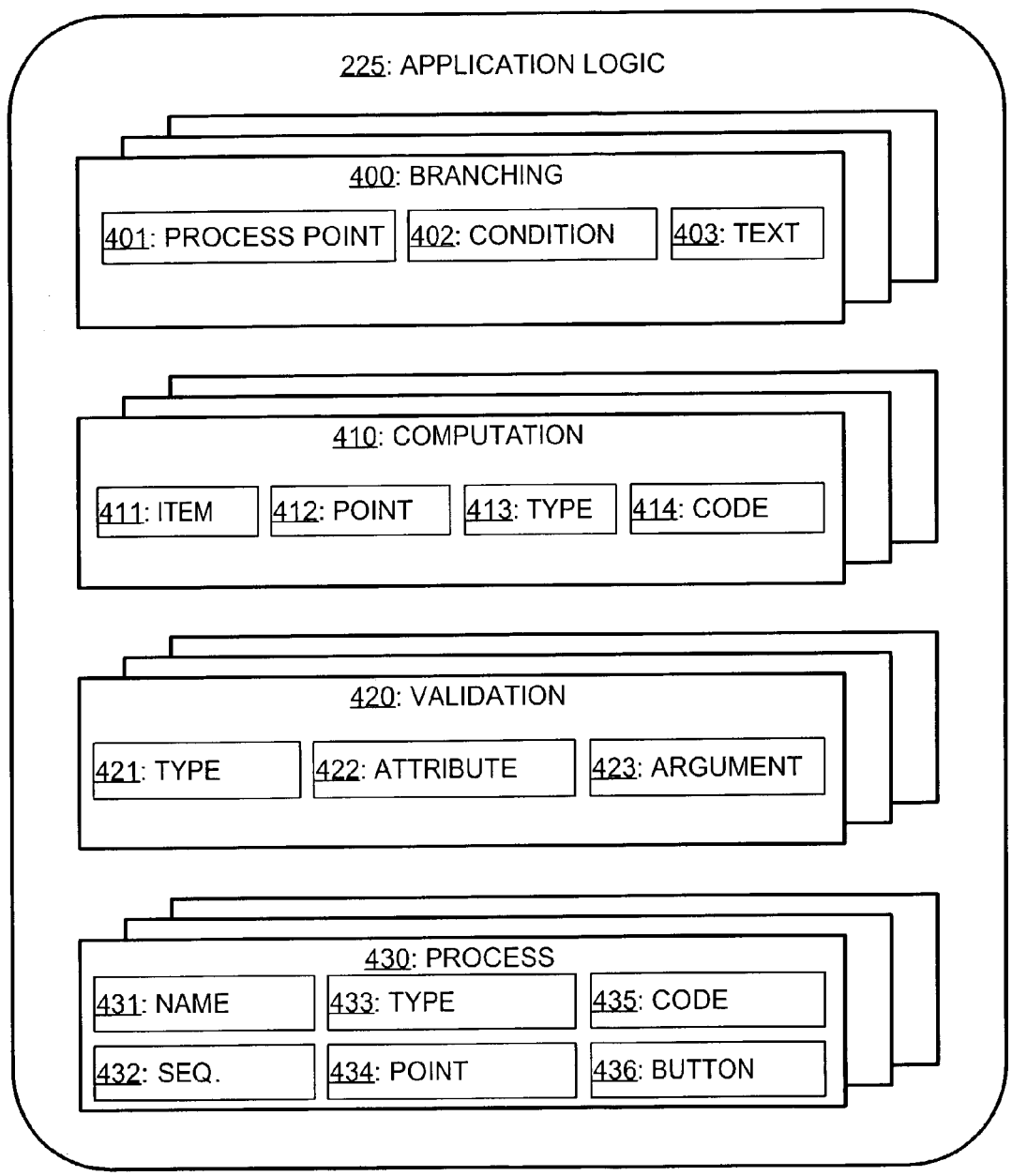
FIG. 4 depicts an implementation of application logic stored in a database in accordance with an embodiment of the present invention.

As shown in FIG. 4, there are at least four types of application logic 225 managed by the database sever 213: branching logic 400, computation logic 410, validation logic 420, and process logic 430.

A branch is an instruction to go to a specific page, procedure, or URL. For example, if the user is at page 1 and submits page 1, page 1 can have a branch that sends the user to page 2, or even back to page 1. Branches can be conditional, so many branches can be considered, and the first branch whose conditions are met will be triggered, thus making the branch occur. Branches can also be unconditional; unconditional branches have no conditions and thus are always taken. Branches are considered in sequence and occur at pre-specified process points 401.

Branch conditions 402 are evaluated when a page is submitted. If the branch condition 402 is met or the branch has unconditional (a hard branch), then the branch is taken. Branches can occur to one of three "destinations", a PAGE, a URL, or a database procedure, such as PL/SQL procedure. Branching to a PL/SQL procedure will execute that procedure. Branches 400 are evaluated in sequence within specific processing points 401. These processing points 401 include: BEFORE_COMPUTATION, for before "after submit" computations; BEFORE_VALIDATION for before "page validations"; BEFORE_PROCESSING for before "after-submit processing"; and AFTER_PROCESSING for after "after-submit processing". Some types of conditions use an additional condition text attribute 403, e.g. to compare a flow or page item to a specific string.

Page computations 410 allow flow or page items to be reevaluated when the page is submitted or displayed. The objective of a page computation 410 is to assign a new value to a flow or page level item 411. For example, a page level item 411 that holds the current date called CURRENT_DAY_YYYYMMDD could use the following PL/SQL source: to_char(sysdate, 'YYYYMMDD'). The point attribute 412 indicates the computation point at which the computation is to occur (e.g. after-submit or before-header). The type attribute 413 indicates what kind of computation is performed.

If the type attribute 413 is "expression", then a database expression such as a PL/SQL expression in the code attribute 414 is evaluated. On the other hand, sometimes it is useful to set the value of one flow item 411 to the value of another. This can be done using Static Text substitutions, in which the type attribute 413 is "substitution". In this computation, strings are substituted if an item name is prefixed with an ampersand in the code attribute 414.

A validation 420 is an edit check. If the validation condition is positive the edit check passes; if the validation condition is negative then an error condition is raised. The error message is the error text. Error pages can use their own template; the error template is defined as a flow attribute. Validations 420 occur after submit. Validations 420 are performed after after-submit computations and before after-submit processing The validation type attribute 421 indicates the type of the validation in general, and the particular condition that is used for validation. The validation attribute 422 defines the validation edit check with respect to a particular argument or piece of code. If the validation check involves another argument, the validation argument 423 may be used.

A page process 430 performs processing of data. Page processes 430 have complete access to the session state 227. Each page can have any number of page processes. Page processes can succeed (run without error) or fail (run but raise an error). If any process 430 fails then the process error message text is displayed. Page processes (when they succeed) can display a success message in the area so designated by the page template. Each page process performs one of the following: (1) built-in functionality, (2) PL/SQL calls, or (3) SQL statements.

The process name attribute 431 serves as an identifier of the process 430. The sequence attribute 432 indicates the order in which the process 430 is invoked. Processes 430 are executed in order of process points 434 and then process sequence 432, so the sequence 432 is used to order processes that fire at the same process point 434. The process type attribute 433 identifies how to process the process code attribute 435.

The process point 434 indicates when the process 430 fires. Processing points 434 can be grouped into two categories: ON_LOAD and ON_SUBMIT. ON_LOAD processing points fire when a page is being displayed or loaded. ON_SUBMIT processing points fire when a page is being processed or submitted.

The ON_LOAD processing points include: AFTER_AUTHENTICATION—after user is authenticated for both show and accept; BEFORE_HEADER—before the header template is displayed; AFTER_HEADER—after header template and before body template; BEFORE_BOX_BODY—after body has been "opened", before box welcome text; BEFORE_SHOW_ITEMS—before any page items are displayed; AFTER_SHOW_ITEMS—after page items, before box footer text; AFTER_BOX_BODY—after box footer text, before "body close"; BEFORE_FOOTER—before footer template, after "body close"; AFTER_FOOTER—after footer template.

The ON_SUBMIT processing points include: AFTER_AUTHENTICATION—after user is authenticated for both show and accept; AFTER_SUBMIT—This is the default process point for performing non-display processing. All processing that generates HTML is expected to be one of the above, listed in the order in which they will be displayed. Processes 430 can be conditional as specified by their attributes (not shown) or be responsive to action on the button specified in the button attribute 436.

Logical Session Management

One aspect of the present invention is directed to logical session management architecture, in which each page view uses a distinct database session (including log in and log off). Therefore, this aspect is directed to an asynchronous, stateless application model. If, on the other hand, a synchronous connection is used as in the three-tier model, then a database session would be maintained over multiple page views, consuming valuable virtual memory for hold the session state, even for users that are not actively using the database.

A logical session model is adopted for two reasons: first, because of the asynchronous (stateless) nature of interactive web-based applications; and, second, for performance. Web-based applications are asynchronous (stateless), in that a network connection need not be kept open during requests or other interactions. In fact, with web-applications, there may be no predictable pattern in the user's interaction; a user of a web-based application may generate numerous page views in a minute, and then not generate another page view for hours.

Maintaining a physical database session is expensive with respect to server resources. A physical database connection consumes memory and other database server resources. However, a web-based application in accordance with an embodiment of the present invention does not maintain a database session between requests, by connecting (logging in) and disconnecting (logging out) for each page view request. Thus, the web-based application need not consume any database resources during the user's "think time" or the time between requests. This feature allows a web-based application in accordance with this embodiment to make an arbitrary number of requests at arbitrary intervals without consuming any server resources between the requests.

The net result is that only the pages being generated or processed concurrently have active sessions in the database. This allows a large number of users to interact with the web-based application in accordance with this embodiment since the database does not maintain a database session for the duration of the users interaction with the web-based application, but only for the fraction of a second required to generate or process a page request.

Depending on the authentication method selected, the runtime engine 215 determines the user for each "page show" or "page process" request. Each request to view a page contains a "Session ID". If no Session ID is passed, then a new Session ID is generated. One user can have any number of sessions (identified by distinct Session ID's). Each page passes Session ID's to the runtime engine 215 using hidden HTML form fields or via a URL. The Session ID is the key used to access the session state.

Session state 227 is maintained using database tables by the database server 213. Each "set" request generates a SQL UPDATE or INSERT statement on a session state table 227. The primary key of the table is the Session ID combined with the ItemID. Requests to "set" session state to a value equal to the current value is short circuited (i.e., not performed) to improve performance. The table used to store session state contains one row per item per session. Information about a session is maintained in a parent table whose primary key is the Session ID. Thus, the parent table contains one row per physical session.

Flow and page item values are remembered from page to page, and a developer can reference these values as necessary. Session state allows the developer to reference items set on a previous page view. Thus, there is no need for the application server to carry session state from page to page.

The session information can be referenced using the bind variable syntax: item_Name from SQL and PL/SQL. For example, the v('ITEM_NAME') function can be called from PL/SQL packages, procedures, and functions. In markup text, the &ITEM_NAME syntax may be used, and Java code can invoke wwvFlowJava.v("ITEM_NAME"). In all of these cases, the ITEM_NAME is resolved into the value of the items that was referenced by ITEM_NAME.

Items can be defined at two levels: the flow level and the page level, corresponding to application and user interface variables, respectively. The scope of items created at the flow level is global so that any item value declared at the flow level can be referenced from any page. Page level items are also global in scope, but, unlike flow level items, they are designed to be markup form fields. Flow level items are designed to be global variables.

Flow level items, like page level items, are always persistent throughout the logical session but are defined on an application-wide basis. Thus, once a value is set for a flow level item, that value is remembered for the duration of the logical session. If a flow level item's value has not been set in the logical session, then the flow level item's value is null when referenced.

Page level items are similar to flow level items except page level items are an attribute of a page. If the page is deleted then all of the page level items are deleted with it. Page level items are similar to flow level items except the definition of a page level item contains a large number of display attributes, all of which are not available in flow level items. Page level items also have a source and default attribute. These values are set when the page is referenced. Page level items also offer more control over how the session state is managed. Page level items have an attribute that controls session state management: use cache before default The "use cache" attribute is Boolean. A true/yes value indicates that the "cached item value" overrides "item source value". A false/no value of NO indicates that the "item source value" overrides "cached item value". The "cached item value" is the value of the item maintained in the session state 227. The "item source value" for a page item is identified as a page item attribute. The item source value sets the value for an item. The value can come from one of two places, namely a static value or expression defined in the "item source value" or the value already set and maintained in the "cache".

Operational Overview

Figure 5:
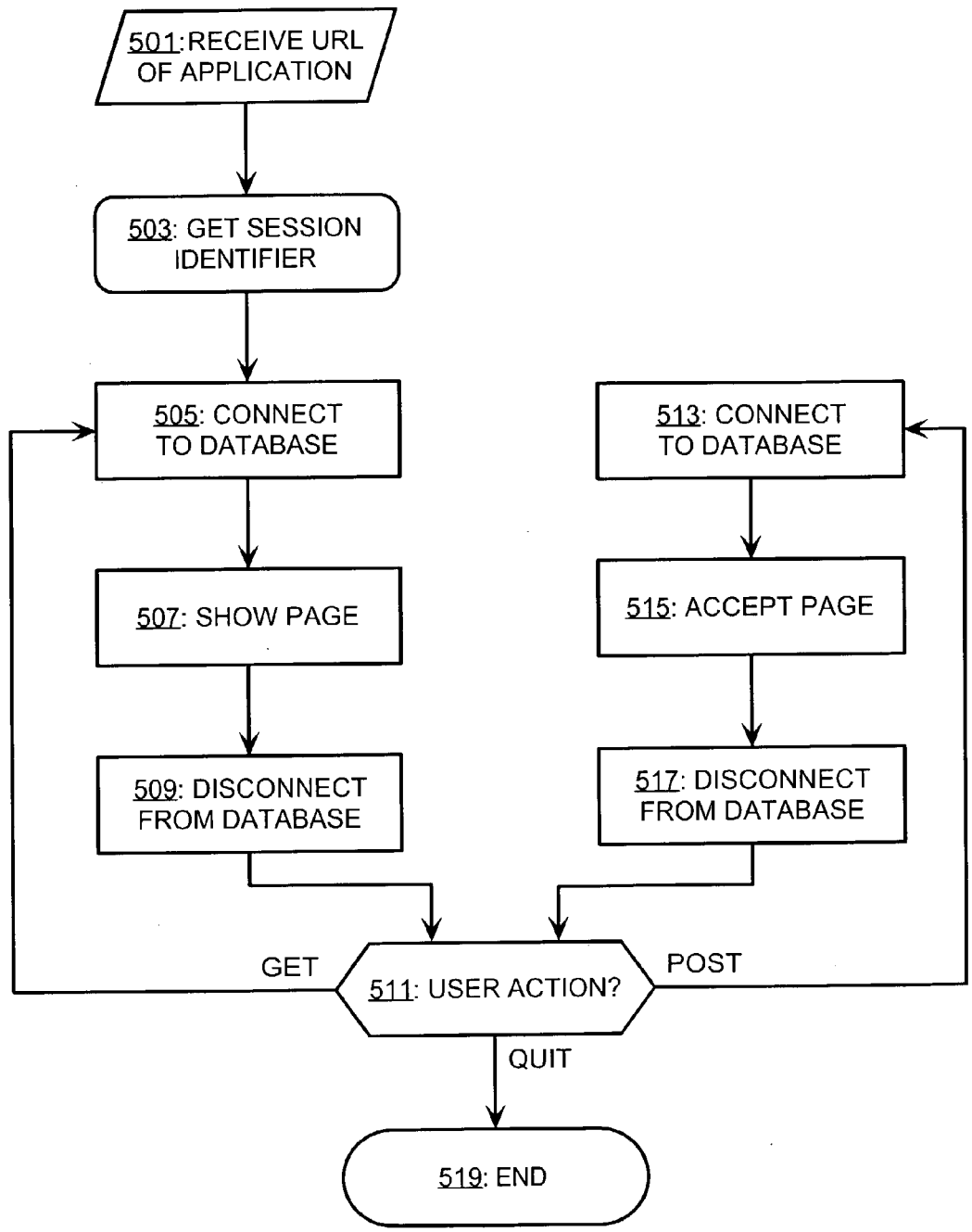
FIG. 5 is a flowchart illustrating the high-level operation of an embodiment of the present invention.

Referring now to FIG. 5, depicted is a flowchart showing the operation of one embodiment of the present invention. At step 501, the application server 211 receives a URL from a web client 201 that identifies a web-based application. The user at the web client 201 is then authenticated and a Session ID is generated to identify a logical session for the user (step 503).

In order to show the first page of the web-based application, the application server 211 initiates a database session by connecting to the database server 213 (step 505) and calls a show page routine in the runtime engine 215 to obtain the markup of the page for the web client 201 (step 507). The operation of the show page routine (step 507) is described in greater detail hereinafter. After obtaining the markup at step 509, the application 211 terminates the database session by disconnecting from the database server 213, thereby freeing up valuable system resources for another user who may need to access the database server while the first user is thinking or filling out the form at the web client 201. Lightweight TCP login and logout procedures can be used to connect and disconnect, respectively, with the database server 213.

At some point (step 511), the user at the web client 201 will perform an action that requires use of the application server 211 and database server 213 resources. For example, the user may click on a button, navigational tab, or otherwise generate a new URL that requests another page in the web-based application without posting data. In this case, execution branches back to step 505, where another database session is initiated, the page is rendered (step 507) and the database session is terminated (step 509). Execution returns to step 511 where the application server 211 waits for another user action without typing up system resources other than the information in the session state 227 database objects.

Alternatively, the user may post the form data to the web-based application, in which case execution branches to step 513, where yet another physical database session is initiated. The posted data is accepted in step 515 and markup for the resulting page is generated and transmitted to the web client 201. To detect the presence of multiple, simultaneous, and conflicting updated to the same information by the users, a checksum may be used to verify the integrity of the data without requiring complex and slow synchronization procedures such as a two-phase commit. Thereafter, the physical database session is terminated (step 517) to free up system resources for another user. Execution returns to step 511 where the application server 211 waits for another user action without typing up system resources other than the information in the session state 227 database objects.

If a user is particularly active and is involved in repeated initiating and terminating database connections, it is likely that the session state data for this user migrates to a high-speed buffer cache. Therefore, the apparent performance penalty of storing session state information in the database rather than directly in virtual memory is absent. Eventually, the user will log out from the web-based application or simply fail to act within a preset period (e.g. 8 hours or 8 years). In this event, the session state of the use is flushed (step 519).

Show Processing

Figure 6:
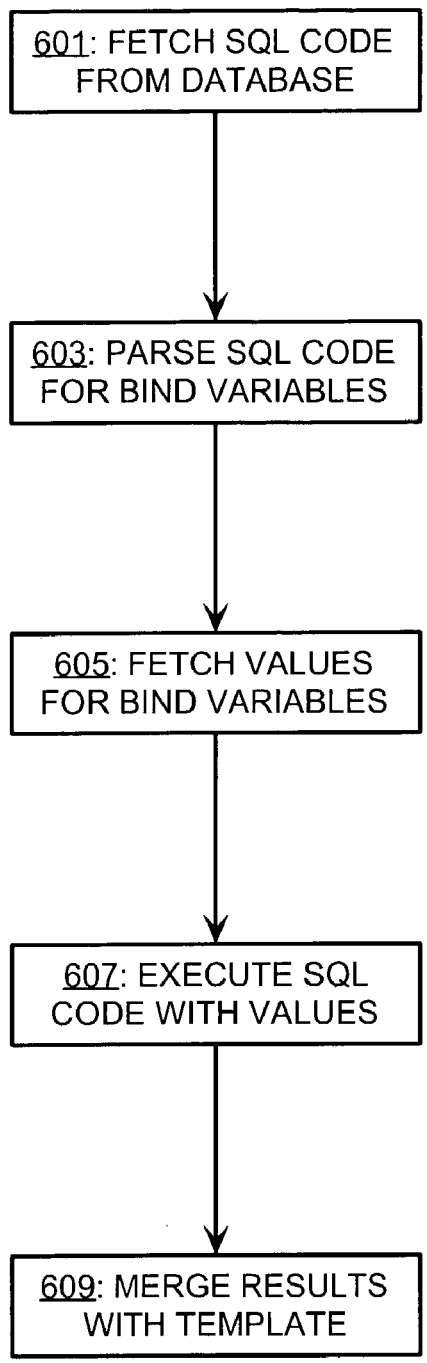
FIG. 6 is a flowchart illustrating the operation of processing a page an embodiment of the present invention.

One implementation of generating the markup for a page is shown in FIG. 6. It may be thought that using application logic 225 in a database would be much slower than executing compiled, native machine code 813. However, a combination of database techniques may be employed to achieve unexpectedly prompt performance. In particular, when a database executes a particular SQL statement, that SQL statement is parsed and an execution plan is generated. This information, the parsed SQL statement and the execution plan, are saved in a data structure called a cursor, which can be reused by other users if the SQL statement is byte-for-byte identical. Therefore, this implementation of the present invention is configured to ensure that the SQL statements to fetch data from the database are constant with respect to different users and session. This requirement is attained by using bind variables in the SQL statement to pass the user and session-specific information when the SQL statement is executed so that the parsed SQL statement and the execution plan can be reused without additional overhead.

When a page is shown, at least for the first time, step 601 is executed in which SQL code is fetched from the database. This SQL may have been specified in the source attribute 326 of the region 320 of the page 310. At step 603, the fetched SQL statement is parsed to identify the bind variables. The values for the bind variables are fetched from the session state 227 (step 605), and the SQL statement is executed with the fetched values (step 607) to obtain the relevant application data 221. This SQL statement may have already been parsed into a cursor, so much of the overhead associated with executing a SQL statement is obviated.

At step 609, the results of the step 607 are merged with the display templates 223 to produce the markup for transmission to and rendering at the web client 201. In one embodiment, steps 601–609 are bypassed if the result of step 609 had previously been saved in a region markup cache. The saved markup can be associated with a Flow ID and/or a Session ID. Accordingly, the reuse of generated markup on a per-application, per-user, or per-session can be achieved.

Hardware Overview

Figure 7:
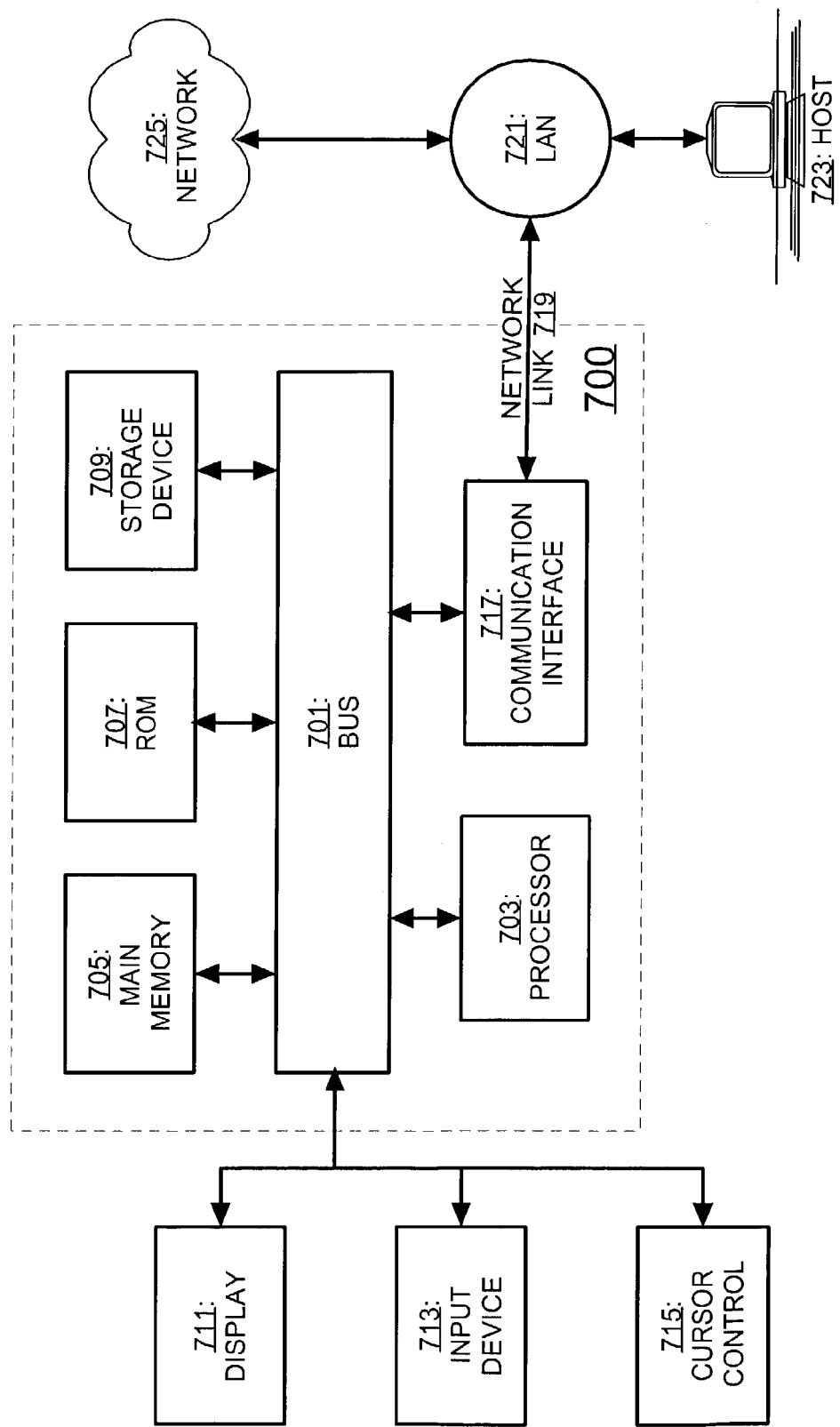
FIG. 7 depicts a computer system that can be used to implement an embodiment of the present invention.
Figure 8:
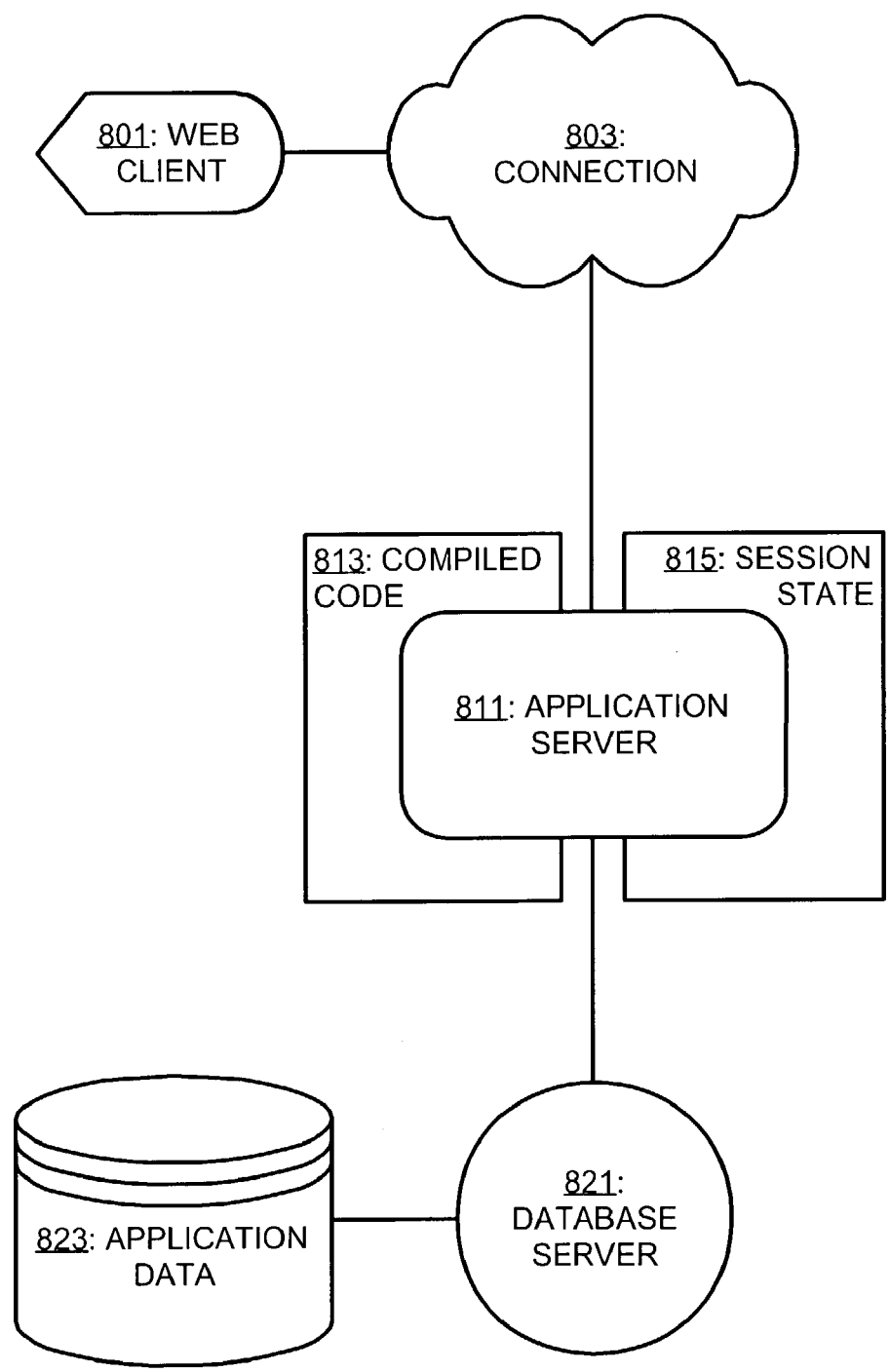
FIG. 8 depicts an architecture of a three-tier web application.

FIG. 7 illustrates a computer system 700 upon which an embodiment according to the present invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, its functionality is provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the network(s), network link 719, and communication interface 717. In the Internet example, a server (not shown) might transmit requested code belonging an application program for implementing an embodiment of the present invention through the network 725, local network 721 and communication interface 717. The processor 703 may execute the transmitted code while being received and/or store the code in storage device 79, or other non-volatile storage for later execution. In this manner, computer system 700 may obtain application code in the form of a carrier wave.

The term "computer-readable medium" as used herein refers to any medium that participates in providing instructions to the processor 705 for execution. Such a medium may take many forms, including but not limited to nonvolatile media, volatile media, and transmission media. Non-volatile media include, for example, optical or magnetic disks, such as storage device 709. Volatile media include dynamic memory, such as main memory 705. Transmission media include coaxial cables, copper wire, and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for operating a web-based application, comprising:
   storing a collection of data for use to execute the functionality of the application in a database;
   receiving a request from a user to perform an operation within the application, said application comprising a collection of pages stored in the database and said request indicating at least a page number corresponding to a page of the application;
   converting the request into a database procedure call corresponding to the operation;
   retrieving an instruction corresponding to the database procedure call from the database based on the page number;
   performing the instruction wherein the instruction integrates at least some of the data in the collection for the application in accordance with the instruction; and
   completing the request based on performing the retrieved instruction.

2. A method according to claim 1, wherein:
   the retrieved instruction includes a branch instruction that indicates another page within the collection; and
   said completing the request includes rendering the other page indicated by the branch instruction.

3. A method according to claim 1, wherein:
   the application comprises at least one item stored in the database;
   the retrieved instruction includes a computation that refers to the item; and
   said completing the request includes updating a value of the item by performing the computation.

4. A method according to claim 1, wherein:
   the retrieved instruction includes a validation; and
   said completing the request includes presenting an error message based on performing the validation.

5. A method according to claim 1, further comprising:
   performing the instruction when a page is being rendered.

6. A method according to claim 1, further comprising:
   performing the instruction in response to a submit request from the user.

7. A method according to claim 1, wherein:
   the request includes a logical session identifier; and
   said completing the request includes retrieving at least some session state from the database based on the logical session identifier and completing the request based on the retrieved session states.

8. A method according to claim 1, wherein:
   said completing the request includes retrieving a display template for the page indicated by the page number and rendering the page based on the display template.

9. A computer-readable medium bearing instructions for operating a web-based application, said instructions being arranged, upon execution, to cause one or more processors to perform the method according to claim 1, wherein the computer-readable medium is any one of: a volatile memory and a non-volatile memory.

10. A method for deploying a web-based application from a development site to a client site, comprising:

updating tables storing a collection of data for the application in a first database at the development site, wherein the collection of data provides the information to execute the functionality of the application and the application comprises a collection of pages and is responsive to an instruction corresponding to a database procedure call to perform an operation within the application indicating at least a page number corresponding to a page of the application and wherein the database procedure call was converted from a corresponding request to perform the operation within the application indicating the at least page number corresponding to the page of the application; distributing the tables from the development site to a second database at the client site; and transferring contents of the tables distributed from the development site to corresponding tables at the client site in a single transaction; wherein at least some of the collection of data is operable to be integrated in accordance with the instruction that is retrieved from the second database.

11. A method according to claim 10, wherein the tables storing the application include a collection of pages and application logic.

12. A method according to claim 11, wherein:

the application logic includes a branch instruction that indicates another page within the collection such that completing a request from a user includes rendering the other page indicated by the branch instruction.

13. A method according to claim 11, wherein:

the application logic includes a computation that refers to an item such that completing a request from a user includes updating a value of an item by performing the computation.

14. A method according to claim 11, wherein:

the application includes a validation such that completing a request from a user includes presenting an error message based on performing the validation.

15. A method according to claim 11, wherein the tables storing the application include display templates and application data.

* * * * *